June 13, 1933.　　　D. PERLMAN　　　1,913,948
SYNCHRONOUS MOTOR
Filed May 2, 1931
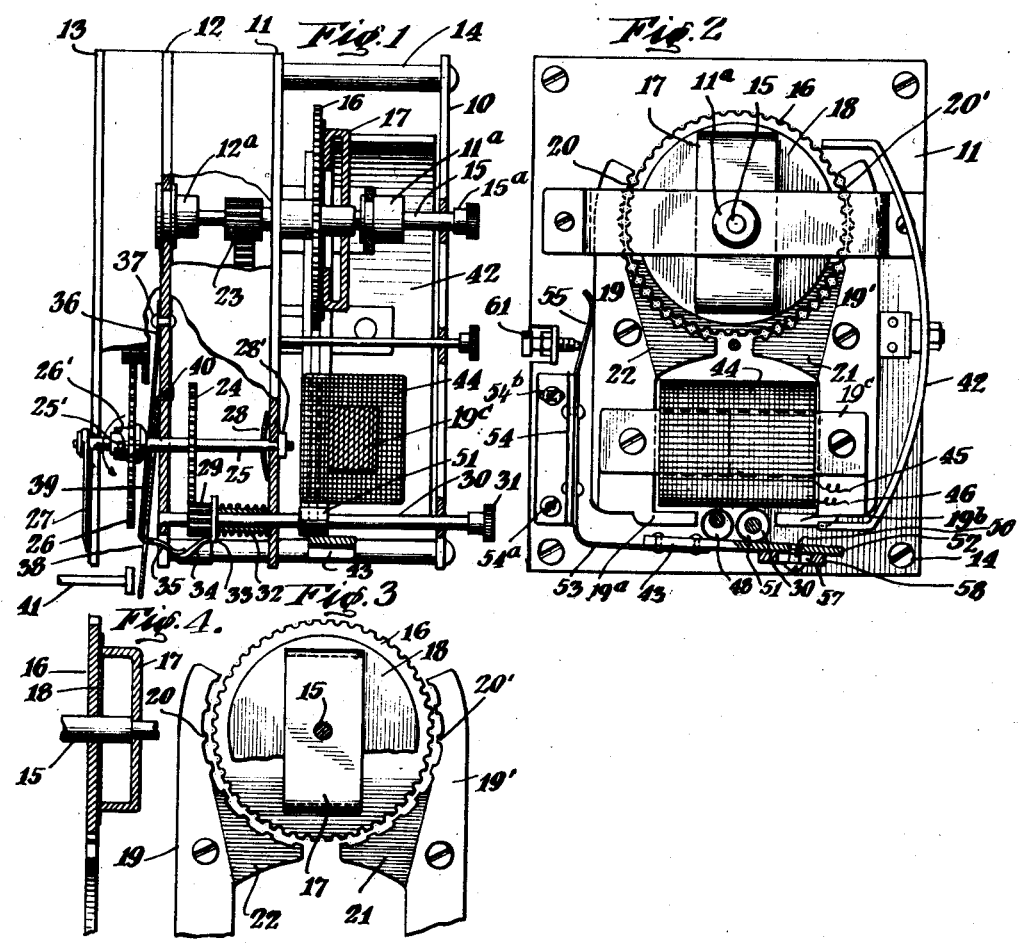
INVENTOR
David Perlman.

Patented June 13, 1933

1,913,948

UNITED STATES PATENT OFFICE

DAVID PERLMAN, OF BRONX, NEW YORK

SYNCHRONOUS MOTOR

Application filed May 2, 1931. Serial No. 534,493.

This invention relates to improvements in electrically operated time-pieces, and it is the main object of my invention to provide simpler yet practical and efficiently operating means for improving the electro-motion as well as the mechanical elements of the timing mechanism.

My invention relates to a novel construction of the rotor and stator to render the rotor operation more silent, efficient and fool-proof and in a novel construction of a fly-weight element for the synchronization of the rotor upon manual starting.

A still further object of my invention is the provision of means to overcome the unpleasant noise incident to the operation of the rotor, particularly when its bearings are worn or loosely fitted, such means include the creation of an electro-magnetic field in the stator which is relatively eccentric to the rotor center and exerts a slight magnetic downward pressure upon the rotor in the direction of its gravity preventing it from being displaced in its bearings with each current impulse.

These and other objects and advantages of my invention will become more fully apparent as the description proceeds, and will then be specifically defined in the appended claims.

It will be understood that the improvements to be hereafter described are especially applicable to the well known manually started type of motors and that these improvements are also applicable to almost any type of electric timing mechanism and clock motors.

One of the main disadvantages connected with the use of all known motors for the operation of electric clocks is that they are noisy in operation, and that the noise becomes more and more pronounced with the wearing out of the bearings especially when the same are originally badly adjusted. My improvements are designed to overcome this disadvantage by departing from the conventional type of stator construction having a magnetic field relatively concentric to the rotor between the same and the stator tending to agitate the rotor in its bearings with each current impulse. According to my invention I produce an electro-magnetic field in the stator which is relatively eccentric with relation to the rotor and exerts a slight magnetic downwardly directed pressure upon the rotor that is solely in the direction of its gravity to prevent an oscillation in its bearings with each current impulse.

Furthermore, my stator produces a stronger and better magnetic torque than that normally obtainable in the conventionally designed motors for slow speed operation without the necessity of increasing the dimensions of the motor and its pole pieces or teeth and gaps or slots between them.

In motors of this type, the torque and power of the rotor depends largely upon the dimensions of the pole pieces or teeth, and on the size of the equally proportionated gaps between them on rotor and stator. The torque diminishes with the construction of the pole pieces or teeth and gaps smaller and closer spaced owing to the cross-magnetic leakage.

I avoid this in my construction by eliminating every alternate pole piece or tooth on the stator which widens the gap to about three times the size of the conventional dimensions and thus reduces the magnetic leakage and increases the torque and power of the motor.

The invention further includes the arrangement of a simple loosely mounted fly weight on the rotor shaft for the synchronization of the rotor upon its manual start. By this means I avoid the use of the conventionally used connecting springs or other complicated means at present in use.

This fly weight is made of steel permanently magnetized and formed to complete a magnetic circuit. When the fly weight is mounted on the rotor shaft it will stick magnetically to the rotor's side revolving with the rotor in the same manner as the customary fly wheel. The desired independent movement between the rotor and fly weight is controlled by a paper or any washer of non-magnetic property and of the proper thickness interposed between the rotor and the fly weight.

In the accompanying drawing forming a material part of this disclosure:

Fig. 1 is a sectional side elevation of an electric alarm clock constructed according to my invention.

Fig. 2 is a rear view thereof.

Fig. 3 is a detail view of a rotor and stator.

Fig. 4 is a sectional detail view of a modified form of my rotor fly weight element.

In a casing formed by the metal plates 11, 12, a dial wall 13 a conventional timing mechanism or clock work is arranged and driven by the rotor pinion 23 meshing with the first gear of the train driving in the usual manner the hands of an alarm clock. This train terminates with gear 26 which is loose and slidingly mounted on shaft 25 carrying on its outer end over the dial plate 13, a hand 27 for the desired setting of the alarm operation.

The shaft 25 is frictionally engaged to plate 11 by friction spring 28 and lock nut 28' and is rotated manually against this friction by its gear 24 meshing with pinion 29 on shaft 30 terminating with thumb knob 31. Gear 26 has a cam 26' engaging with pin 25' of shaft 25 which forces the gear 26 when turning in direction indicated by the arrow one revolution in 24 hours to slide and compress the leaf spring 36 riveted at its inner end to plate 12 at 37. The outer end of leaf spring 36 terminates in an angularly bent projection 35 passing through a slot 38 of a second leaf spring 39 pivoted at 40 on plate 12.

The spring projection 35 is in constant engagement with one side of cam leaf spring 34 and the other side of spring 34 engages with collar 33 of shaft 30 and is holding it in place counteracting the pressure of spring 32 tending when tripped and released by spring 34 to slide the shaft 30 with collar 51 towards plate 11 thereby releasing armature 43 for its free operation of the alarm bell or buzzer. This occurs at the moment when the cam 26' trips the pin 25' thereby releasing the leaf spring 36 which while being compressed disengages the cam leaf spring 34 from collar 33, and both springs 36, 39, being in contact with the inner end of shaft 30 prevent it from sliding in before the predetermined time for setting off the alarm.

The alarm is stopped by either pulling out shaft 30 by its knob 31 or by pressing in plunger 41 against leaf spring 39 which slides the shaft 30 with it collar 33 in engagement again with leaf spring 34. This also blocks the armature operation by collar 51 and also resets thereby the alarm for its operation during the next 24 hours.

As disclosed in Figures 1, 2, and 3, my novel improved rotor 16 is mounted on a shaft 15 which is housed in oilless bearings 11$^a$ and 12$^a$ and terminates with a twirling knob 15$^a$ for manual starting.

The magnetized fly weight 17 having substantially the form of an inverted C in cross section is arranged upon the rotor shaft 15 and separated from the rotor by a thin washer of paper or other non-magnetic metal element 18 for the necessary independent revolving motion between the rotor and fly weight required in the automatic synchronization of the rotor upon manual starting.

My two novel improvements in stator constructions are illustrated in Figures 2 and 3. The shaded sections 21, 22 of stator cores 19 and 19' and rotor 16 indicate the magnetic field formed by the stator continuation sections 21, 22, with the relative magnetic influence on rotor 16 which exerts the downwardly directed pull solely in the direction of its own gravity on the rotor and thereby prevents it from vibrating and causing noise in the bearings.

The novel principle of improving the stator's torque and power by widening the gaps between the pole pieces on the stator is illustrated in detail on stator of Figure 3.

The motor is energized by alternating current passing through leads 45, 46, of coil 44 mounted on laminated core 43 and bridging the oppositely disposed stator laminations 19 and 19' which in turn energize the rotor 16 for driving the timing mechanism, and with its oppositely disposed stator extensions 19$^a$ and 19$^b$ energize the vibrating armature 43 for the alarm operation above described and for ringing the alarm bell 42.

The armature 43 is carried by a leaf spring 53 which is mounted on an angle bracket 54 fastened with screws 54$^a$ and 54$^b$ to plate 11. The screw hole at 54$^b$ is slightly elongated to provide the required armature spring tension adjustment by adjusting screw 61 with spring extension 55 resting against stator 19.

The novel improved construction illustrated and combined with the operation of my device will be entirely clear from the specification described and by simultaneous inspection of the drawings, and it will be evident that I have provided the novel improvements enumerated therein.

Having thus described my invention, what I claim as new and desire to secure by Letters Patent is:

1. In an electric motor for timing mechanism and clocks, a rotor, and a stator having poles disposed symmetrically to a vertical line through the center of said rotor and being so constructed as to encircle a large section of the rotor below the horizontal diameter of said rotor, and a smaller section of the rotor above the horizontal diameter of said rotor to produce magnetically a bearing pressure of the rotor against the stator solely in the direction of gravity of said rotor.

2. In a manually startable synchronous motor for the operation of timing mechanism, and clocks, a rotor, a shaft for said rotor, a stator having field poles with means for exciting the same a loosely coupled fly weight element mounted on the rotor shaft for aiding to bring into and maintain said rotor in synchronism with the alternating supply current, said fly weight being a permanent magnet facing the rotor and being magnetically attracted thereto, and a non-magnetic member interposed between said magnet and rotor.

3. In a manually startable synchronous motor for timing mechanism and clocks, a rotor, a shaft for said rotor, a stator having field poles with means for exciting the same, a fly weight element loosely mounted on said shaft, said element constituting a permanent magnet and having its poles disposed toward one face of said rotor, the rotor serving to bridge said poles and a non-magnetic element interposed between said magnet and said rotor for allowing relatively slippage between said magnet and said rotor above a predetermined rotor speed.

4. A manually startable, synchronous, alternating current, motor including a rotor, a shaft for said rotor, a stator magnetic means for rotating said rotor, and a flyweight member loosely mounted on the shaft of said rotor, said member constituting a permanent magnet, and consisting of a bar bent to form a pair of spaced pole members, said pole members facing said rotor and adapted to be attracted thereto.

5. A manually startable, synchronous, alternating current, pulsating motor including a rotor, a shaft for said rotor, a stator, and a flyweight member loosely mounted on the shaft of said rotor, said member constituting a permanent magnet facing said rotor and adapted to be attracted thereto.

6. An alternating current synchronous motor; a rotor having a plurality of polar teeth along its periphery; a stator having field poles with means for exciting same by an alternating current to produce a stationary axis alternating magnetic field, each of said field poles having an arcuate row of spaced teeth, cooperating with said rotor teeth for producing rotational movement of said rotor in synchronism with said alternating current; a shaft for said rotor; bearing means for supporting said rotor shaft; the arc comprised by said field poles being symmetrical with respect to a vertical plane through the center of said rotor and unsymmetrical with respect to a horizontal plane through the center of said rotor for producing bearing pressure by magnetic attraction of said rotor against said stator solely in the direction of gravity of said rotor.

7. An alternating current synchronous motor; a rotor having a plurality of polar projections, a stator having field poles with means for exciting the same by an alternating current to produce a stationary axis alternating magnetic field, each of said field poles having an arcuate row of spaced polar projections, cooperating with said rotor for producing rotation of said rotor in synchronism with said alternating current; a shaft for said rotor, bearing means for supporting said rotor shaft, the arc enclosed by said stator poles being symmetrical with respect to a vertical plane through the center of said rotor and unsymmetrical with regard to a horizontal plane through the center of said rotor for producing bearing pressure of said rotor shaft by magnetic attraction of said rotor against said stator solely in the direction of gravity of said rotor.

8. In combination with a synchronous motor of the character described, the combination comprising a stator; means for energizing the same; a rotor; a fly weight element loosely mounted upon the rotor shaft, said fly weight being a permanent magnet to be attracted against said rotor, and a friction washer of non-magnetic material interposed between said fly weight and said rotor to produce relative slippage of said fly-weight at a predetermined speed of said rotor.

9. In combination with a synchronous motor as described in claim 8, in which said magnetic fly weight consists of a bar bent to have adjacent poles, being bridged by said rotor, acting as a magnetic armature.

10. In combination with a synchronous motor of the character described, the combination comprising a stator; means for energizing the same; a rotor; a permanent magnetic fly weight, loosely mounted upon the rotor shaft to be attracted against said rotor to produce relative slippage of said fly weight at a predetermined speed of said rotor to provide a yielding connection between said fly weight and said rotor.

11. In combination with a synchronous motor, as described in claim 10, in which said fly weight consists of a magnetized C-shaped steel bar with the open space between the adjacent poles being bridged by said rotor, acting as a magnetic armature.

12. In combination with a synchronous motor of the character described, comprising a stator; means for energizing the same; a rotor, a permanent magnet fly weight, loosely mounted upon the rotor shaft to be attracted against said rotor by magnetic force to produce relative slippage of said fly weight at a predetermined speed of said rotor to act as a yielding connection between said fly weight and said rotor.

13. In combination with a synchronous motor, as described in claim 12, in which said fly weight consists of a magnetized C-shaped steel bar being bridged by said rotor, acting as a magnetic armature.

14. An alternating current synchronous motor having a toothed rotor; arcuate toothed stator poles each having a portion of its arc disposed above and a second portion disposed below a horizontal line through the center of said rotor horizontally arranged adjacent to said rotor; means for magnetically energizing said rotor poles to produce an alternating current magnetic field to rotate said rotor, the portion of the arc comprised by said stator poles above the horizontal line through the center of said rotor being less than the portion of the arc comprised by the stator poles below the horizontal line through the center of said rotor for producing magnetic bearing pressure of said rotor solely in the direction of its gravity.

15. An alternating current synchronous motor having a toothed rotor and multi-toothed stator, pole pieces arranged adjacent to said rotor, adjacent teeth on said stator pole pieces being arranged to align with alternate rotor teeth; means for magnetically energizing said stator pole pieces to produce an alternating current magnetic field to rotate said rotor; certain of the teeth on said stator pole pieces comprising an arc above the horizontal line through the center of said rotor, and certain other teeth on said stator pole pieces comprising an arc below said horizontal line, said second mentioned arc being greater than said first mentioned arc; and said stator pole teeth being disposed symmetrically to a vertical line through the said stator, for producing magnetic bearing pressure of said rotor solely in the direction of its gravity.

Signed at Bronx, in the county of Bronx, and State of New York, this 30th day of April A. D. 1931.

DAVID PERLMAN.